G. WISNYEI & S. WEISS.
FRUIT GATHERER.
APPLICATION FILED SEPT. 24, 1917.

1,253,554. Patented Jan. 15, 1918.

Inventors
G. Wisnyei
S. Weiss

By N. M. Wilson
Attorney

UNITED STATES PATENT OFFICE.

GEORGE WISNYEI AND SIMON WEISS, OF AKRON, OHIO.

FRUIT-GATHERER.

1,253,554.  Specification of Letters Patent.  Patented Jan. 15, 1918.

Application filed September 24, 1917. Serial No. 192,904.

*To all whom it may concern:*

Be it known that we, GEORGE WISNYEI and SIMON WEISS, subjects of the King of Hungary, residing at Akron, in the county of Summit and State of Ohio, have invented certain new and useful Improvements in Fruit-Gatherers, of which the following is a specification.

This invention relates to certain new and useful improvements in fruit gatherers.

The primary object of the invention is the provision of a device adapted for gathering any kind of fruit and depositing the same in a convenient position for packing without injuring or bruising the fruit, the device being light in weight, capable of being easily moving about and being inexpensive to manufacture.

A further object of the invention is the provision of a receiving and cushioning device adapted for positioning beneath a fruit tree, and which fruit will readily fall upon shaking the tree, the arrangement being such that the fruit will not be injured when gathered in this manner and the fruit collected for great convenience in sacking or crating the same.

Figure 1:
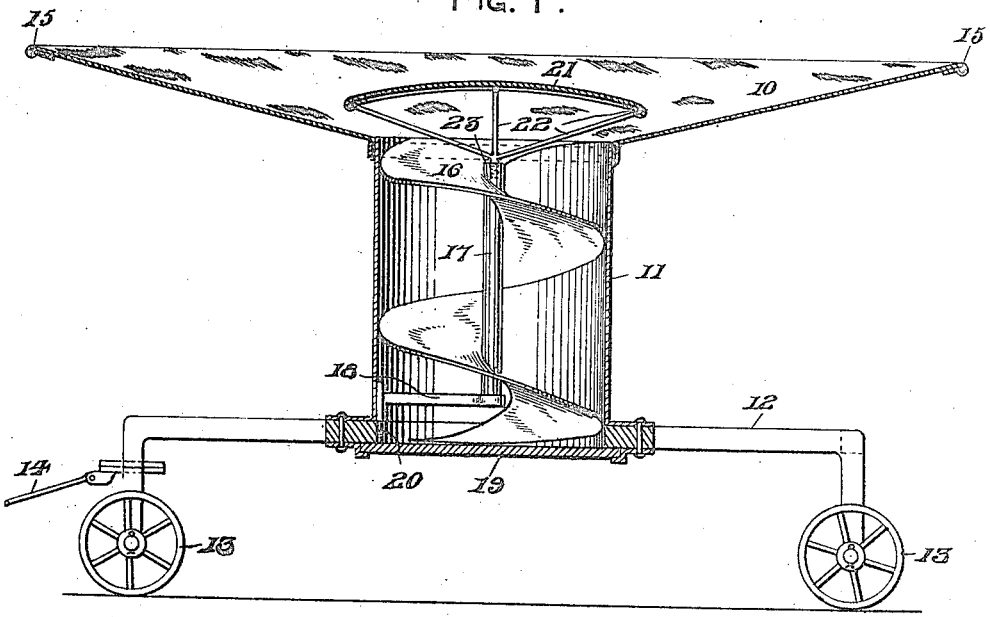
Figure 2:
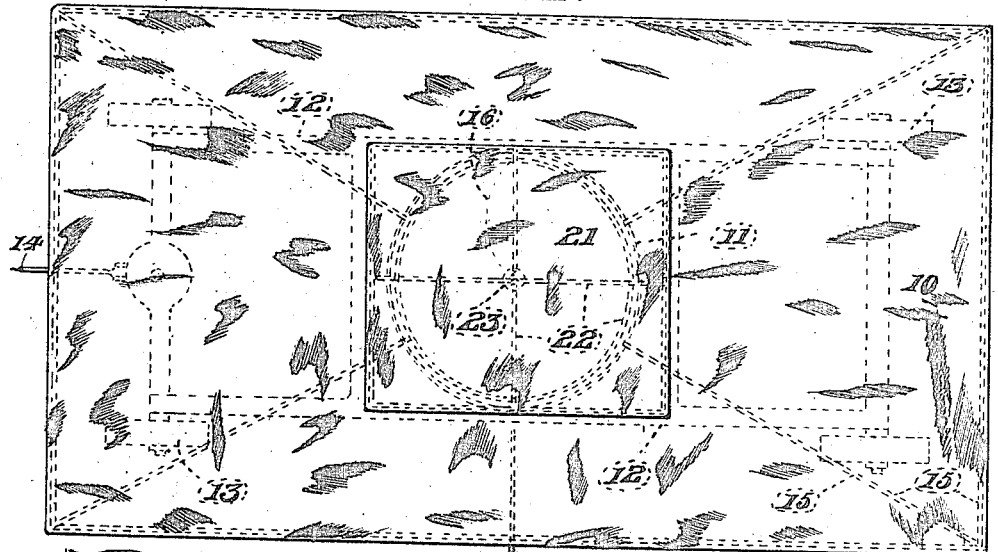
Figure 3:
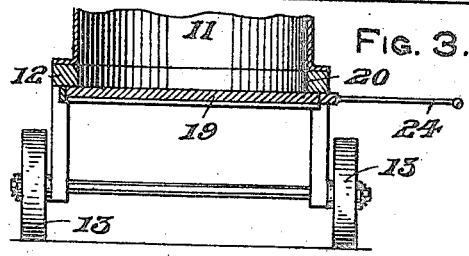

In the drawings forming a part of this application, and in which like designating characters refer to corresponding parts throughout the several views, Figure 1 is a vertical longitudinal sectional view of the device, Fig. 2 is a top plan view thereof, and Fig. 3 is a vertical transverse sectional view through the conducting portion of the device.

It will be understood that my device may be employed for gathering any kind of fruit such as peaches and pears and is arranged to catch the same upon their descent from the tree and before reaching the ground, the device embodying a receiving apron 10 which directs the fruit to a central conductor 11 mounted upon a truck 12 having ground wheels 13 and a draft tongue or pole 14.

The apron 10 is preferably formed of fabric stretched over a rectangular frame 15 preferably formed of wire and mounted upon the upper end of the cylindrical conducting member 11, said apron constituting a receiving hopper and serving to cushion the fruit which is dropped thereon. A spiral platform 16 is arranged within the conductor 11 surrounding an axial post 17 mounted within the conductor upon a radially positioned arm 18 carried by the conductor, the arrangement being such that any fruit which falls upon the apron 10 will pass downwardly into the conductor 11 traveling to the bottom of the conductor upon the platform 16.

A removable slide 19 is arranged upon the truck 12 beneath a circular opening 20 provided in the truck and coinciding with the conductor 11. The fruit passing downwardly upon the platform 16 reaches the slide 19 without bruising the fruit by reason of the gradual traveling movement of the fruit, and upon removing the slide 19, the fruit may be withdrawn from the conductor and received within suitable receptacles, not shown.

A rectangular canopy 21 is arranged above the open upper end of the conductor 11 the said canopy being formed of fabric stretched over a metal frame 22 which is detachably mounted upon the upper end of the post 17, by being screw-threaded therein as at 23. The complete operation of the device will be apparent, the truck 12 being drawn by means of the tongue 14 to a convenient point beneath a fruit tree, the fruit falls upon the apron 10 and canopy 21 when the tree is shaken or the fruit separated therefrom in any desirable manner. The fruit is prevented from being injured by reason of the resilient nature of the said apron and canopy, and passes of its own weight downwardly upon the platform 16 to a point where it is readily removed from the conductor 11 by withdrawing the slide 19. The canopy 21 is slightly curved for assisting the fruit in passing thereover onto the apron 10, it being understood that the space between the canopy 21 and the apron 10 is sufficient for permitting the fruit to pass therebetween into the conductor 11. A suitable handle 24 is provided for the slide 19.

What we claim as new is:—

1. A device of the class described, comprising a truck, a cylindrical container mounted thereon, an apron shaped hopper upon the top of the container, a movable slide beneath the container, and fruit conducting means spirally arranged within the conductor.

2. A device of the class described, comprising a truck, a cylindrical container mounted thereon, an apron shaped hopper upon the top of the container, a movable slide beneath the container, an axially arranged post within the conductor, a canopy movably mounted upon the post overlying the central portion of the hopper adjacent the upper end of the conductor, and a fruit conducting platform spirally arranged around the post extending from the top to the bottom of the conductor.

3. A device of the class described comprising a wheeled truck having a central opening therein, a cylindrical conductor arranged upon the truck around said opening, a removable slide beneath said opening, a radial arm within the conductor, an upright post upon said arm, a spiral platform around said post leading from the top of the conductor to a point adjacent the said slide, a canopy carried by the top of the post overlying the upper end of the conductor, and a stretched fabric hopper carried by the upper end of the conductor spaced from the canopy.

In testimony whereof we affix our signatures.

GEORGE WISNYEI.
SIMON WEISS.

Witnesses:
 BERTHA SIMON,
 MYER WISE.

Copies of this patent may be obtained for five cents each, by addressing the "Commissioner of Patents, Washington, D. C."